(12) United States Patent
Schmalzried

(10) Patent No.: US 6,367,028 B1
(45) Date of Patent: Apr. 2, 2002

(54) SELF DIAGNOSING COMMUNICATIONS BUS AND METHOD OF OPERATING SAME

(75) Inventor: Richard T. Schmalzried, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/262,094

(22) Filed: Mar. 4, 1999

(51) Int. Cl.[7] .......................... G06F 11/277; G06F 11/00
(52) U.S. Cl. .......................................... 714/1; 714/735
(58) Field of Search .............................. 714/1, 43, 716, 714/735, 750; 710/33, 100; 370/452, 249; 375/221, 295, 219, 316; 379/5

(56) References Cited

U.S. PATENT DOCUMENTS

| | | | |
|---|---|---|---|
| 3,995,258 A | * | 11/1976 | Barlow |
| 4,573,154 A | * | 2/1986 | Nakata et al. |
| 4,622,669 A | * | 11/1986 | Pri-Tal |
| 4,791,653 A | * | 12/1988 | McFarland et al. |
| 5,881,066 A | * | 3/1999 | Lepitre |
| 5,978,419 A | * | 11/1999 | Cassiday et al. |

FOREIGN PATENT DOCUMENTS

JP   51127602 A   * 11/1976

* cited by examiner

Primary Examiner—Gopal C. Ray
(74) Attorney, Agent, or Firm—R. Carl Wilbur

(57) ABSTRACT

A communications bus including a plurality of devices connected with the bus has a self diagnosing capability. When operating in a diagnostic mode, a device will send a known diagnostic data transmission set over the bus, receive the diagnostic data transmission set and compare the data sent with the data received. The device will produce a diagnostics fault in response to the comparison.

8 Claims, 4 Drawing Sheets

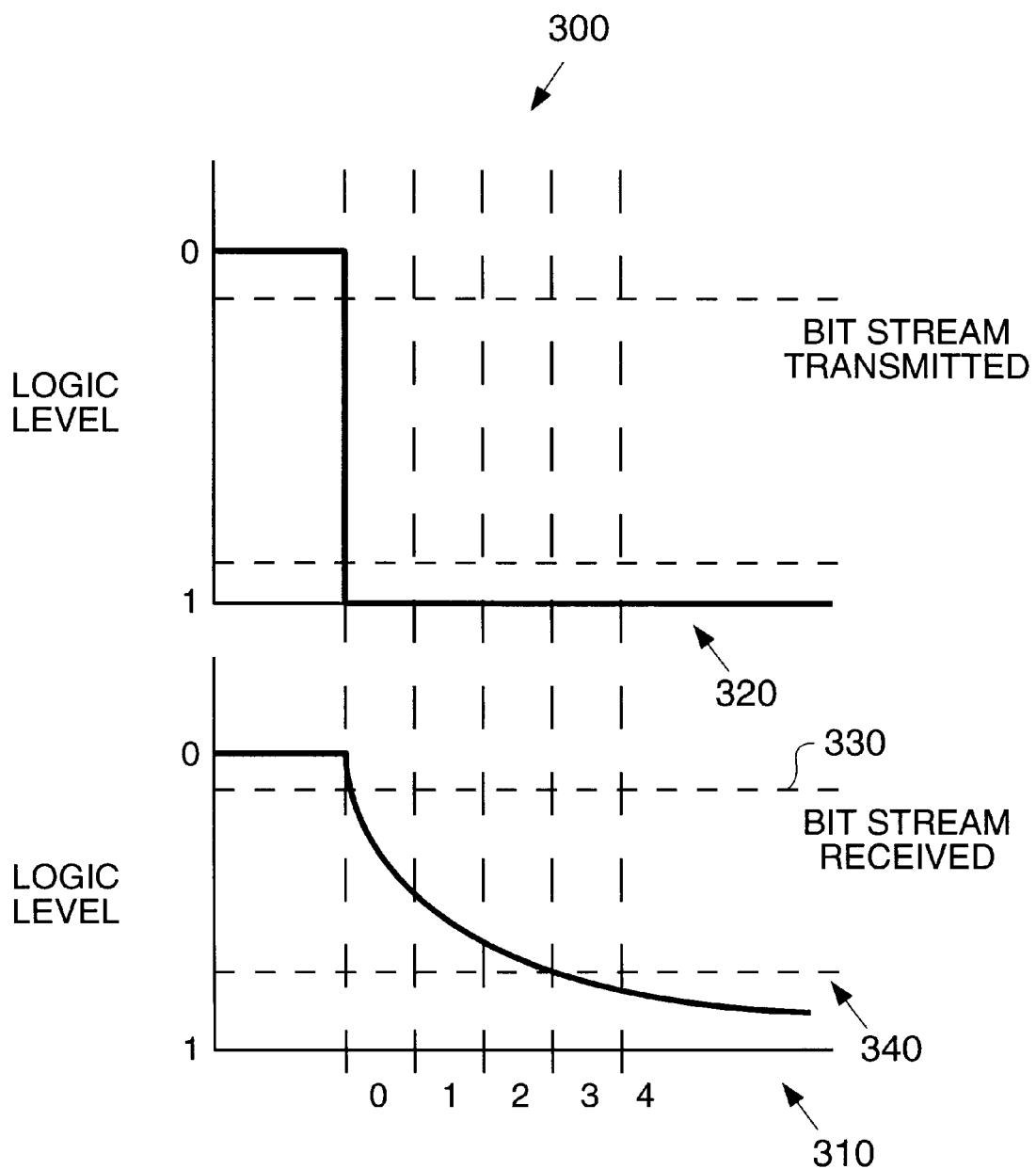

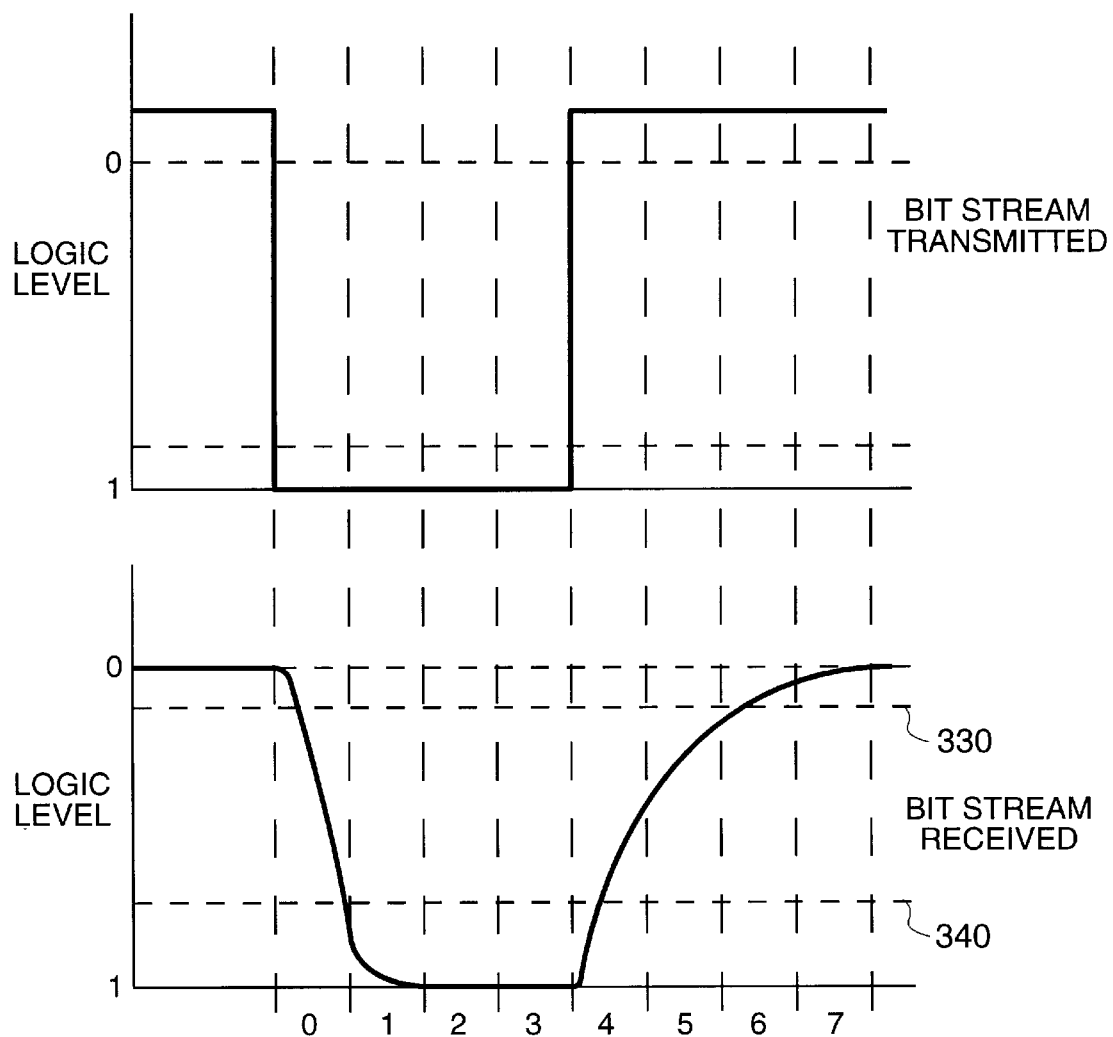

SELF DIAGNOSING COMMUNICATIONS BUS AND METHOD OF OPERATING SAME

TECHNICAL FIELD

The present invention relates generally to a communications bus, and more particularly, to apparatus for diagnosing a communications bus.

BACKGROUND ART

Many different forms of communications busses exist. Typically a communications bus is formed to permit several devices to send and receive data from the other devices. Many different types of data protocols are available for transmitting information over a data bus. Those protocols are dependent, to some extent, on the hardware characteristics of the bus and the types of devices that will be connected to the bus.

Although known communications buses work satisfactorily, they require dedicated test equipment to diagnose malfunctions in the communications. The equipment must be connected to the bus, the malfunction diagnosed, the problem corrected and the equipment removed from the bus. Sometimes the test equipment and service technicians are located a long distance from the communications bus to be tested. It would therefore be preferable to have a communications bus that was capable of self diagnoses and could display a suggested solution to the end user, preferably without the use of dedicated test equipment and service technicians.

DISCLOSURE OF THE INVENTION

In one aspect of the present invention, a method of operating a communications bus in a diagnostics mode is disclosed. The communications bus is generally connected with a plurality of devices, each of the devices having a transmitting and a receiving subsystem. The diagnostics mode includes transmitting a known data pattern on said communications bus, receiving data corresponding to the transmitted data, comparing the received data to the transmitted data, and producing a diagnostics indication as a result of said comparison.

These and other aspects and advantages associated with the present invention will become apparent to those skilled in the art upon reading the following detailed description of the preferred embodiment in connection with the claims and drawings.

BRIEF DESCRIPTION OF THE DRAWINGS

FIG. 6 shows a preferred embodiment of a first diagnostics transmission associated with a diagnostics mode of the present invention.

FIG. 7 shows a preferred embodiment of a second diagnostics transmission associated with a diagnostics mode of the present invention.

DETAILED DESCRIPTION OF A PREFERRED EMBODIMENT OF THE INVENTION

The present invention is not limited to the following detailed description of the best mode embodiment. To the contrary, the present invention includes all other embodiments and alternatives as may fall within the scope of the appended claims.

Figure 1:
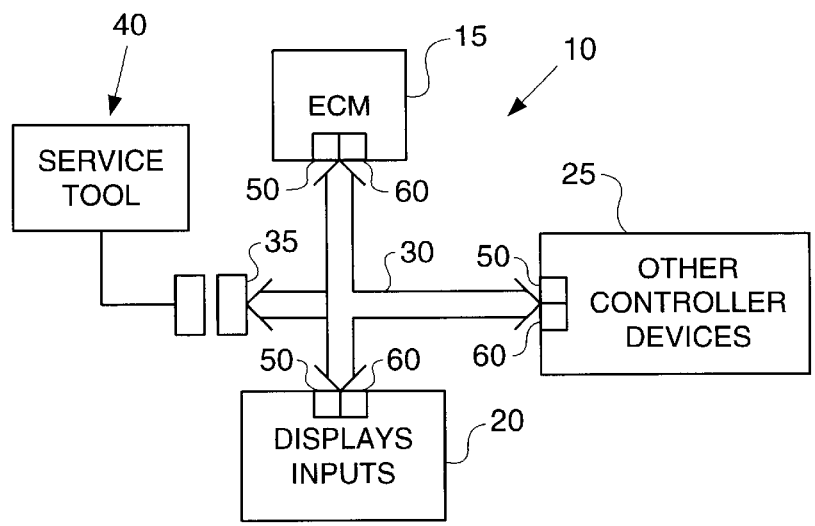
FIG. 1 shows a system level block diagram of a communications bus associated with a preferred embodiment of the present invention connecting various devices and components.

Referring first to FIG. 1, a system level block diagram of a system involving a plurality of components 10 is shown. An electronic control module (EM) 15, a display/input device 20 and other controllers/devices 25 are shown connected with one another by a communications bus 30. In a preferred embodiment the communications bus 30 is connected to an output jack 35, socket or other connector that allows external devices, test equipment or a service tool 40 to be readily and easily connected to the bus 30. In a preferred embodiment each of the devices connected to the communications bus include both a transmitting subsystem 50 and a receiving subsystem 60, both of which are connected with the communications bus 30 and both of which are readily and easily created by those skilled in the art. In a preferred embodiment, the communications bus comprises a two wire semi-differential configuration including a passive state and an actively driven state. One type of such a bus is governed by the SAE standards J1708 and J1587.

Figure 2:
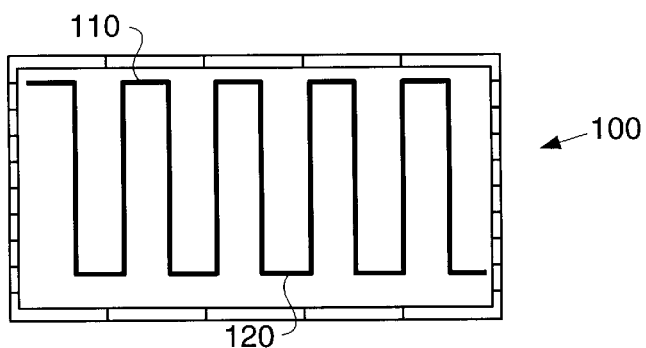
FIG. 2 shows a communications transmission on an ideal bus.

Referring now to FIG. 2 a graphical representation of an ideal data transmission signal 100 is shown. Each component on the communications bus, will passively drive the bus to a high voltage level 110 through a resistor connected to a power source. When a device wants to begin transmitting data on the bus it will actively drive the bus to a low voltage level 120 through a transistor switch, connecting the bus to ground. The transition shown in FIG. 2 is shown as an ideal square wave. As is known by those skilled in the art, the communications bus is comprised of wiring that inherently exhibits capacitance, inductance and resistance, and there will therefore be some exponential decay and rise time associated with any such transition. For data to be accurately transmitted over the bus, however, the decay and rise time must not exceed a predetermined limit.

Figure 3:
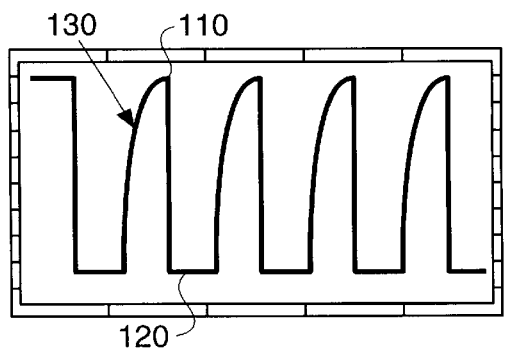
FIG. 3 shows a communications transmission on a bus having excess capacitance.
Figure 4:
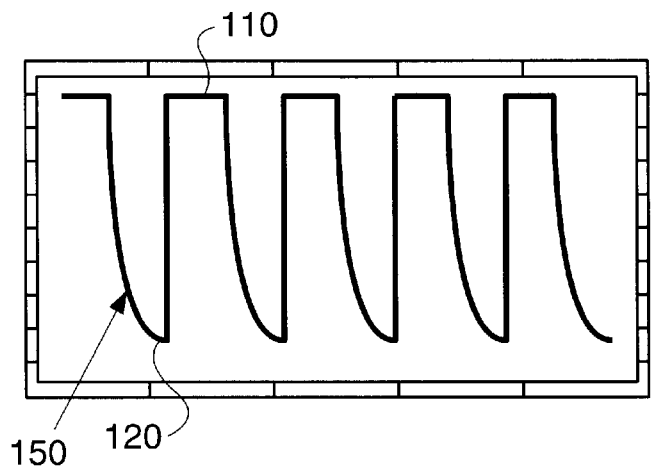
FIG. 4 shows a communications transmission on a bus having too many devices connected to the bus.

Referring now to FIG. 3, an example of the rise time associated with a data stream transmission is shown. As shown in the drawing, the transition 130 from a low voltage level 120 to a high voltage level 110 is not an ideal square wave as is generally shown in FIG. 2. Instead, the transition is an exponential function, the rise time being a function of the resistance-capacitance (RC) time constant of the communications bus 30. As is known to those skilled in the art, if the rise time exceeds a predetermined value (generally a function of the time required to transmit a single bit) then the receiving components and devices on the communications bus will not be able to distinguish the logic level of the corresponding bit. Excessive rise time is generally caused by too much capacitance on the communications bus 30 for the driving voltage. Similarly, as shown in FIG. 4, if there are too many devices connected to the communications bus the transition 150 from a high voltage level 110 (logic level 0) to a low voltage level 120 (logic level 1) will exceed the predetermined limit. In both of these cases, the receiving subsystems 60 of the devices connected to the communications bus 30 will be unable to recognize the measured voltage as the correct logic level. Thus, the data received will not be the same as the data transmitted.

The present system determines that there is a fault condition by causing the device that is transmitting data over the communications bus to subsequently receive that data and compare the data received with the data that had been transmitted. If the two sets of data do not correspond exactly, prior art systems would simply terminate data transmission over the bus, wait some period of time and resend the data. The present invention may go through this same procedure, but after a predetermined number of failed retries (the number could be as few as zero and as many as desired for the particular system) then a preferred embodiment of the present invention will cause the component attempting the communication to begin a diagnostics mode automatically to assist in determining whether the communications bus 30 is the cause of the data transmission failure. Alternatively, the diagnostics mode could be manually entered through a service tool or other operator interface.

Figure 5:
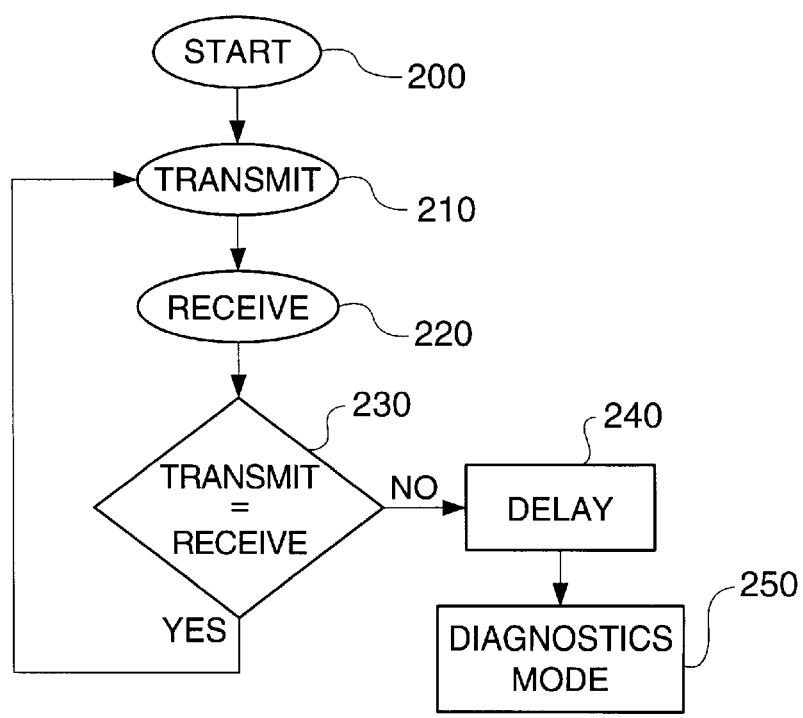
FIG. 5 shows a block diagram of software control implemented in accordance with a preferred embodiment of the present invention.

Referring now to FIG. 5 a flowchart of the data analysis procedures programmed into each of the devices connected to the communications bus 30 is shown. Those skilled in the art can readily and easily implement the programming illustrated in the figure using the appropriate programming language associated with a selected device. As shown in FIG. 5, program control begins in block 200. From block 200 program control proceeds to block 210.

In block 210, a device begins transmitting data over the communications bus 30. Program control passes to block 220.

In block 220, the device that transmitted the data also receives the data by reading it from the communications bus 30. Program control then passes to block 230.

In block 230, the device compares the transmitted data to the received data. If the digital data transmission (i.e. the bits associated with the voltage levels) is the same, then program control returns to block 210 and data transmission continues. If, however, the digital data transmission received is different from the data transmitted then program control passes to block 240.

In block 240, the system waits for a period of time. As described above, the system may then retry the data transmission to see if the communications problem was transient and may retry several times if the transmissions continue to fail. At that time, program control passes to block 250.

In block 250, program control causes the device to enter a diagnostics mode as described in more detail below.

Referring now to FIG. 6, a timing diagram is shown of a representative diagnostics data transmission set which is sent over the data bus when the device has entered a diagnostics mode. The Figure generally shows the data of a transmitted bit stream 300 and the data associated with the received bit stream 310. The transmitted data includes a diagnostics data transmission, which as shown includes a series of consecutive low voltage levels corresponding to a series of bits at logic level 1. If there are too many devices connected to the communications bus 30, then the received bit stream 310 may correspond to the bit stream shown in the figure. As is known to those skilled in the art, there are threshold voltages that divide the voltages into three logic regions. A first threshold is associated with the logic level 0. Voltages that exceed the first threshold 330 correspond to a logic level 0. A second threshold 340 is associated with the logic level 1. Voltages that are less than the second threshold 340 correspond to a logic level 1. Voltages that are between the first and second threshold are indeterminate logic values.

As shown in FIG. 6, the bit 0 transmission is received as an indeterminate value. Likewise each of transmitted bits 1 and 2 are also received as an indeterminate value. It is not until transmitted bit 3 that the data received is recognized as a logic level 1. The device then compares the bit stream transmitted to the bit stream received:

Bit Stream Transmitted=11111111

Bit Stream Received=xxx11111 where x represents a value that is indeterminate.

This pattern represents a system with a decay period that exceeds the communications bus standards. As described above, the device will then issue a diagnostics indication showing that there is an excessive decay time. As described above, this fault is indicative of too many devices being connected to the communications bus. In response to this message, the user could then disconnect some of the devices among other possible solutions.

Referring now to FIG. 7, a timing diagram is shown of a representative diagnostics data transmission set, which is sent over the data bus when the device has entered a diagnostics mode. As shown in FIG. 7, bits 0 through 3 are received as voltages below the second threshold 340, and therefore are recognized as logic level 1 bits. The data transmission changes to a logic level zero for bits 4 through 7. The received voltage levels for bits 4 and 5, however, are indeterminate and no logic levels are assigned to those bits. Transmitted bit 6 is received as a voltage level exceeding the first threshold 330 and therefore is assigned a logic level 0. The device then compares the bit stream transmitted to the bit stream received:

Bit Stream Transmitted=11110000

Bit Stream Received=1111xx00 where x represents a value that is indeterminate.

This pattern represents a system with a rise time that exceeds the communications bus standards. As described above, the device will then issue a diagnostics indication showing that there is an excessive rise time. As described above, this fault is indicative of excessive capacitance in the bus 30 for the voltage being used to drive the bus. In response to this message, the user could implement a variety of corrective actions that could include shortening the bus length, changing the composition of the bus wire, or increasing the bus driver voltage.

It should be recognized that although the preferred embodiment uses the diagnostics data described above, there are other bit streams that could be used that test rise time and decay time. Such bit streams would fall within the scope of the present invention as defined by the appended claims.

By using the diagnostics mode associated with a preferred embodiment of the present invention, a device associated with the communications bus is capable of testing and diagnosing certain faults associated with the bus without the use of external test equipment.

What is claimed is:

1. A method of operating a device connected with a communications bus, said communications bus being connected with a plurality of other devices, the device and the other devices being operable in a transmitting mode and a receiving mode, said method comprising:

operating said device in a transmitting mode to produce a data signal over said bus, said signal being representative of data;

operating said device in a receiving mode to receive the data signal over the communications bus;

comparing said data represented by said transmitted and received signal;

invoking a diagnostics mode in response to said transmitted and said received data being different in some respect, wherein said diagnostics mode comprises transmitting a diagnostics data transmission set, receiving said diagnostics data transmission set, and producing a fault diagnosis as a function of said comparison.

2. The method according to claim 1, wherein said fault diagnosis comprises:

an excessive rise time diagnosis or an excessive decay time diagnosis.

3. A method of operating a communications bus in a diagnostics mode, said communications bus being connected with a plurality of devices, each of said devices having a transmitting and a receiving subsystem, said diagnostics mode comprising:

transmitting a signal representative of a known data pattern on said communications bus;

receiving said signal representative of data;

comparing the received data to the transmitted data; and, producing a diagnostics indication at least as a result of said data represented by said received signal being different from said data being represented by said transmitted signal;

entering a diagnostics mode in response to said step of producing, said diagnostics mode including determing whether a data bit of said recieved data is indeterminate.

4. A method according to claim 3, wherein said diagnostics mode includes a determination that an electrical capacitance of said communications bus is excessive in response to indeterminate data values resulting from a transmitted signal transition from a low voltage to a high voltage.

5. A method according to claim 4, wherein said diagnositcs indication includes an indication that the communications bus has excessive capacitance.

6. A method according to claim 3, wherein said diagnostics mode includes a determination that the number of said plurality of devices connected to said communications bus exceeds the capacity of said bus in response to indeterminate data values resulting from a transmitted signal transition from a high voltage to a low voltage.

7. A method according to claim 6, wherein said diagnostics indication includes an indication that too many devices are connected to the communications bus.

8. An apparatus, comprising:

a plurality of devices, including at least one electronic control module;

a communications bus;

each of said plurality of devices having a transmission and receiving subsystem, said transmission subsystem for transmitting signals representing digital data on said communications bus and said receiving subsystem for receiving signals representing digital data on said communications bus;

wherein one of said plurality of devices transmits signals over said communications bus, receives signals, and compares the data corresponding to said transmitted signal with the data corresponding to said received signals;

wherein said one of the plurality of devices initiates a diagnostics mode in response to at least a portion of said data represented by said transmitted and received signals being different in some respect; and wherein said diagnostics mode includes determining whether data represented by said received signal includes indeterminate values.

\* \* \* \* \*